July 6, 1937.  A. LYSHOLM  2,085,761
AIRCRAFT POWER PLANT
Filed Feb. 14, 1934  3 Sheets-Sheet 1
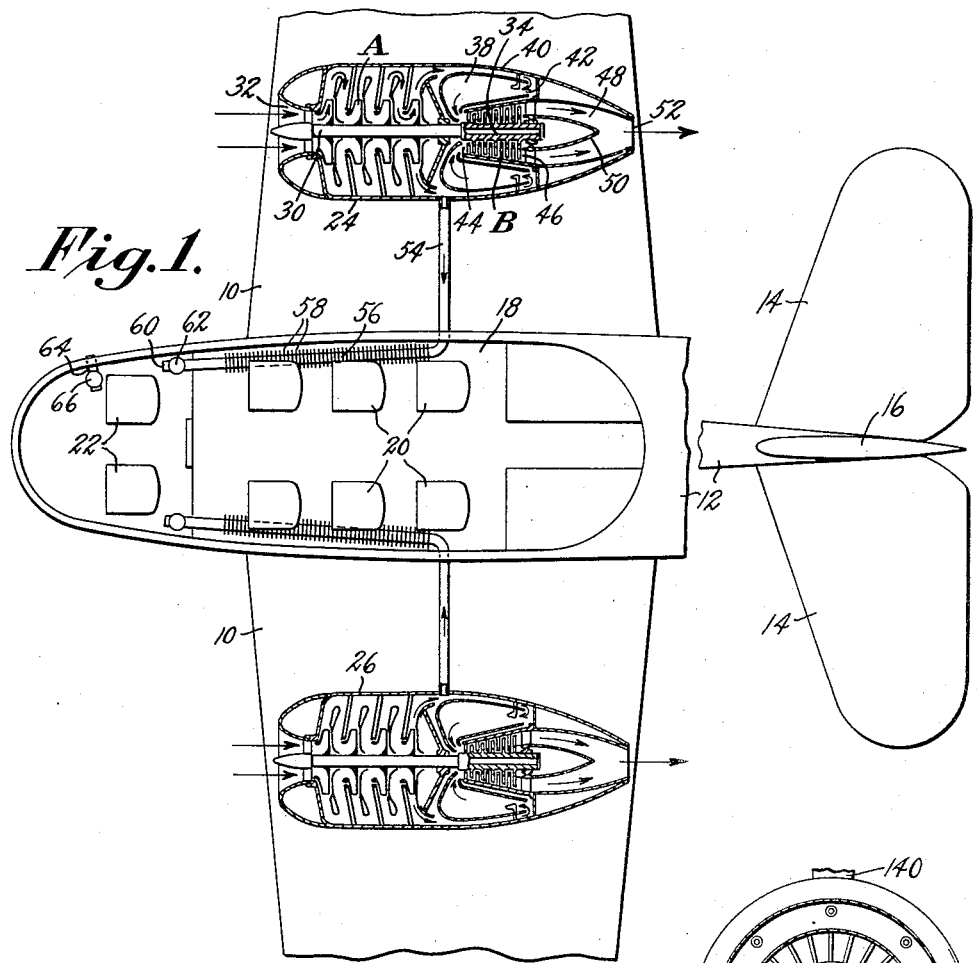
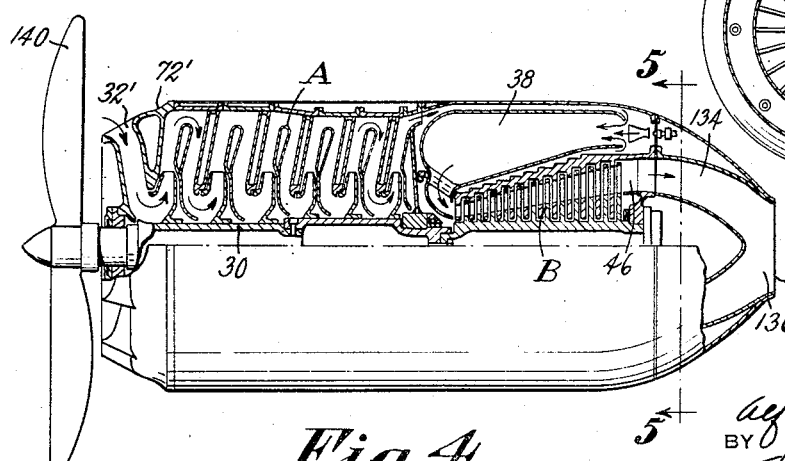
INVENTOR
Alf Lysholm
BY
his ATTORNEY

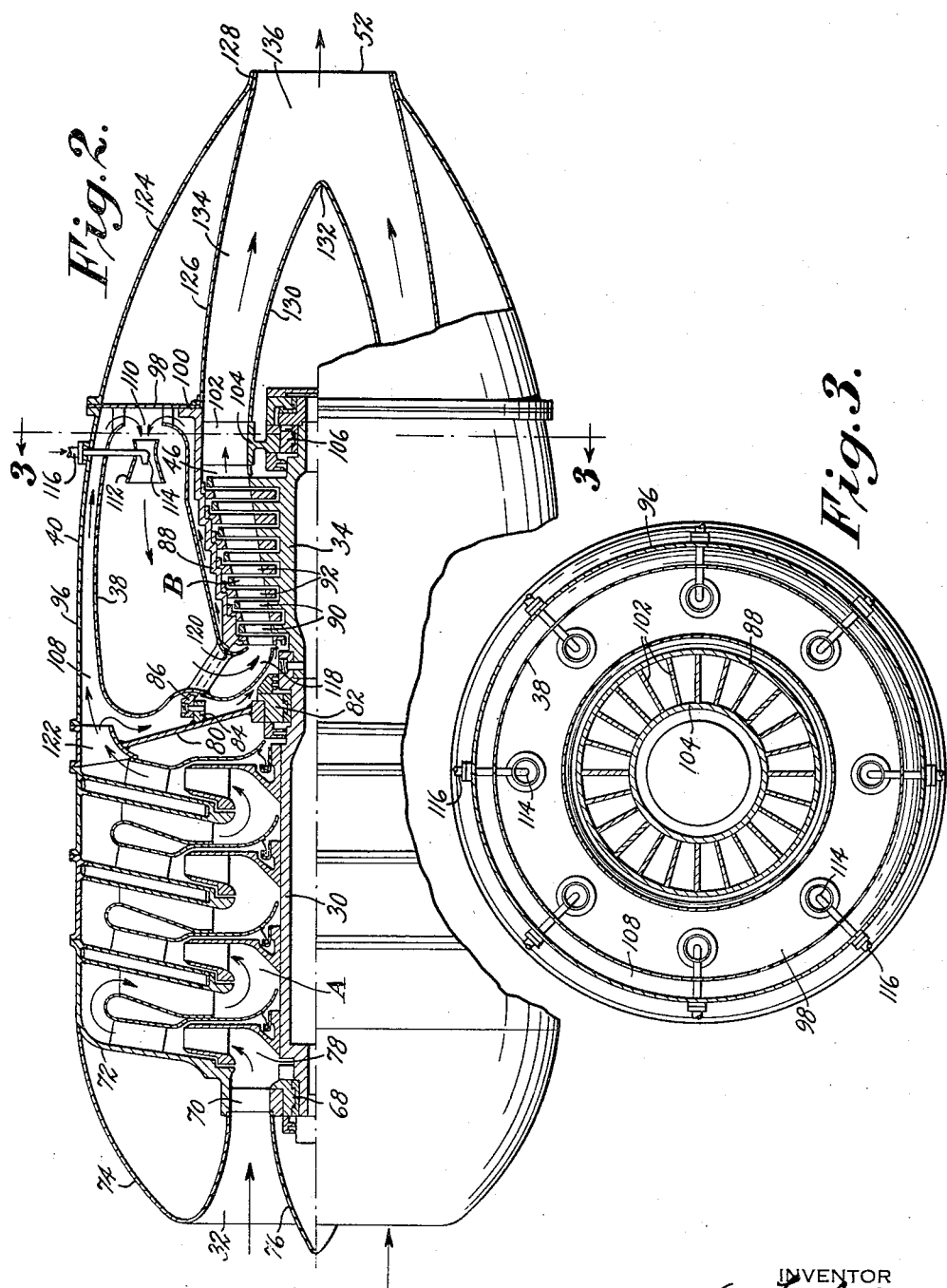

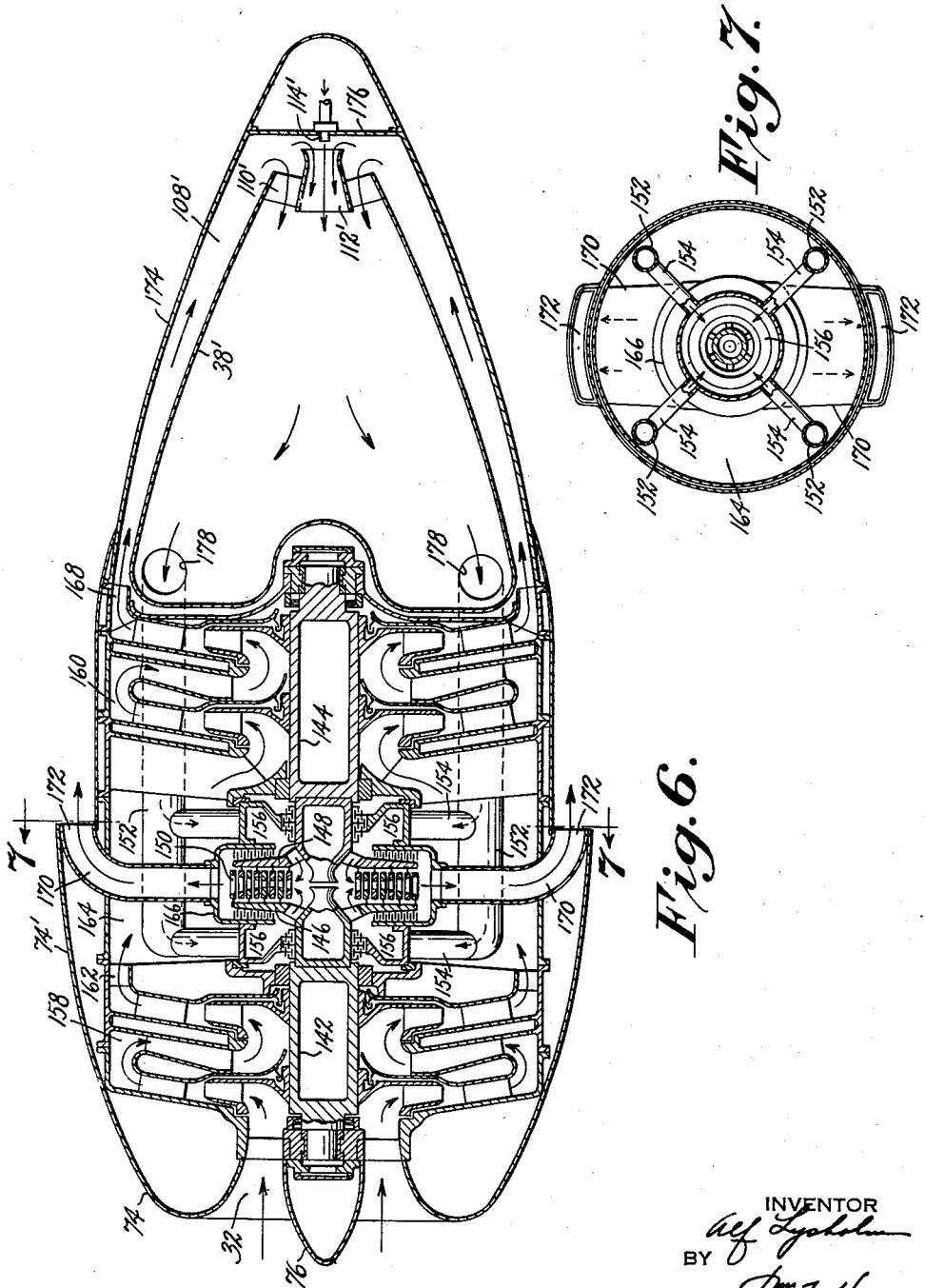

Patented July 6, 1937

2,085,761

UNITED STATES PATENT OFFICE 2,085,761

AIRCRAFT POWER PLANT

Alf Lysholm, Stockholm, Sweden, assignor to Aktiebolaget Milo, Stockholm, Sweden, a corporation of Sweden Application February 14, 1934, Serial No. 711,087
In Germany February 15, 1933

3 Claims. (Cl. 60—35.6)

The present invention relates to aircraft and has particular reference to the propulsion of aircraft wholly or in part due to the reaction or rocket effect of motive fluid produced and utilized in the power plant of the craft. Still more particularly the invention relates to aircraft having power plants in which mechanical power is produced in a gas turbine of the constant pressure type and in which part of the power produced by such turbine is employed to drive compressor means for compressing air to be utilized as a constituent of motive fluid for driving the turbine and in which the energy in the motive fluid over and above that required to operate the compressor means is utilized to provide the drive for the aircraft either wholly or in part due to the velocity energy of the exhaust gases as discharged from the power plant.

The invention is particularly applicable to aircraft for high altitude flying, since the reactive or rocket form of drive is most effective at high altitudes where relatively very high speeds are obtainable, and in one of its phases the invention relates to the supplying of air at normal pressure and temperature to the passenger carrying portion of the craft when the craft is at high altitude, and in a zone of low atmospheric pressure and intense cold.

It is a general object of the present invention to provide an aircraft having a power plant adapted to effect high speed propulsion of the craft at high altitude wholly or in part by rocket propulsion.

Other and more detailed objects of the invention, together with the manner in which they are attained may best be understood from the ensuing description of preferred forms of apparatus for carrying the invention into effect.

In the accompanying drawings, forming a part of this specification:

Fig. 1 is a more or less diagrammatic plan view, partly in cross-section, of part of an airplane embodying the invention;

Fig. 2 is a longitudinal elevation, partly in cross-section, and on an enlarged scale, showing a power plant unit of the kind shown in Fig. 1;

Fig. 3 is a section taken on the line 3—3 of Fig. 2;

Fig. 4 is a view similar to Fig. 2 showing another power plant unit;

Fig. 5 is a section taken on the line 5—5 of Fig. 4;

Fig. 6 is a view similar to Fig. 2 showing still another power plant unit; and

Fig. 7 is a section taken on the line 7—7 of Fig. 6.

Turning now to Fig. 1, the aircraft illustrated is an airplane having wings 10, a fuselage 12 at the rearward end of which are placed elevators 14 and a rudder 16. Located in the forward portion of the fuselage 12, in the conventional manner, is the passenger carrying compartment or cabin 18, in which are located the passenger carrying seats 20 and the seats 22 for the pilots at the forward end of the cabin. The cabin is closed, and is preferably substantially air-tight when the usual openings, such as doors and windows, are closed.

The power plant for the craft comprises two units indicated generally at 24 and 26, mounted on the wings in the usual manner. In the illustrated embodiment these units are alike and it will therefore be sufficient to describe only one of them.

The unit 24 comprises a compressor A which is of the rotary or centrifugal multi-stage type having a shaft 30 carrying the rotor of the compressor. The inlet end 32 of the compressor opens directly forwardly of the craft to provide for unobstructed admission of air to the compressor in a direction opposite the direction of flight of the craft. Shaft 30 extends rearwardly of the compressor and carries the rotor 34 of a gas turbine indicated generally at B. Surrounding the turbine is the combustion chamber 38 which is situated within the outer shell 40 of the unit. Air delivered from the compressor enters the combustion chamber 38 at the rearward end thereof as indicated at 42 and the gaseous motive fluid produced in the combustion chamber by combustion of fuel such as fuel oil with the compressed air is admitted to the forward end of the turbine at 44 and flows axially in rearward direction to the outlet of the turbine indicated at 46. The motive fluid exhausted from the outlet 46 of the turbine flows through the annular passage 48 around the conical shield 50 to the final or atmospheric outlet 52, which is in communication with the atmosphere at the rearward end of the unit.

In its flow through the compressor the air is heated due to compression and hot compressed air is conducted through conduit 54 from the power unit to the cabin 18 of the aircraft. Conduit 54 is extended within the cabin to provide a radiator 56 which may advantageously have heat radiating fins 58 thereon. The radiator 56 is provided with an outlet 60 communicating with the interior of the cabin, and this outlet is controlled by a valve 62. A conduit 64 is provided for exhausting vitiated air from the cabin and this conduit is under the control of a valve 66. Inasmuch as the air as delivered from the compressor A is at higher than atmospheric pressure, the valve 62 or a separate pressure reducing valve is utilized in conjunction with regulation of the outlet valve 66, to maintain normal pressure in the cabin. A similar heat radiating and air supplying means for the cabin may be utilized in conjunction with the second power unit 26. It will be evident that with the arrangement shown a supply of air sufficient to maintain the interior of the cabin at atmospheric pressure with fresh air sufficient for the needs of the persons carried by the craft is insured, as long as the power plant is operating, which is obviously a condition precedent to the maintenance of the craft at an altitude such that an artificial air supply for the interior of the cabin is required. The utilization of the air taken from or adjacent to the outlet end of the compressor also insures a supply of heated air, which eliminates the necessity for providing separate heating means for the craft.

Turning now more particularly to Figs. 2 and 3, a power plant unit of the kind shown diagrammatically in Fig. 1 is illustrated in more detail. The shaft 30 is carried at its forward end by a bearing 68, which in turn is supported by a plurality of radially extending webs 70 which extend inwardly from the front end casing part 72 of the compressor A. At the front end of the compressor an annular shell 74 is provided, and the front end of shaft 30 and bearing 68 are covered by a forwardly projecting conical shell 76. The shells 74 and 76 are shaped so that they provide between them an air inlet opening 32 which is annular in form and of decreasing gross-sectional area from front to rear. This inlet opening provides for free unobstructed entry of air to the inlet 78 of the first compressor stage, since the webs 70 are relatively thin in cross section and preferably stream-lined. As previously mentioned, the power plant is particularly adapted for use in aircraft for high altitude flight where high speeds are attained, and the form and arrangement of the air inlet opening to the compressor are such that the forward motion of the craft is of material assistance in forcing air to the compressor and relieving the work of compression. As will be noted, the form of the inlet is such that some of the velocity of the entering air is converted into pressure by the time the air reaches the first compressor stage. At its rearward end the compressor casing carries an inwardly extending conical plate 80, which in turn carries a center shaft bearing 82. A flange 84 on plate 80 has secured thereto the forward outwardly flared portion 86 of a turbine casing 88 for the axial flow turbine B. As will be observed from Fig. 2, casing 88 is generally conical in form, and the smaller inlet end of the casing is placed adjacent to the compressor. Between the casing 88 and the rotor 34 of the turbine, which rotor is carried on a hollow continuation of shaft 30, there is provided an annular conical axial flow blade system comprising a plurality of rows of moving blades 90 carried by the turbine rotor, and a plurality of rows of stationary guide blades 92 carried by the turbine casing. This blade system preferably consists of reaction blades providing for multi-stage expansion of motive fluid with high thermodynamic efficiency of the turbine, and the diameters of the blade rows and the lengths of the turbine blades from the inlet to the outlet end of the turbine are such that motive fluid is expanded along a path of flow of increasing cross-sectional area from the inlet to the outlet end of the turbine. However, in expanding the motive fluid in a power unit of the type designed to provide propulsion solely by the rocket effect of the exhaust gases, only a part of the available heat energy of the motive fluid is required to be expanded in order to provide sufficient mechanical energy to operate the compressor and to overcome the frictional losses of the moving parts of the unit. Consequently the blade system of the turbine is designed so as to not expand the gases from admission pressure to the lowest exhaust pressure which can be economically obtained in a turbine of the character described. Instead, the cross-sectional area of the path of flow for motive fluid through the turbine provides for only partial expansion of the motive fluid from admission pressure to an intermediate pressure, at which intermediate pressure the gases are discharged from the turbine outlet 46. By way of example, the blade system of the turbine shown in Fig. 2, when receiving motive fluid formed by internal combustion of fuel with compressed air, at an admission pressure of, for example, four atmospheres and an admission temperature of 800° C. absolute, advantageously is designed to discharge motive fluid at the outlet end of the turbine at a pressure of, for example, 2 atmospheres.

In the illustrated embodiment, an outer shell section 96 is secured to the rearward end of the compressor casing, and at the rearward end of the outer shell section 96 an annular radially extending plate 98 is secured, which at its inner circumference is secured as at 100 to the rearward end of the turbine casing 88. Extending radially inwardly from the outlet end of the turbine casing is a plurality of webs 102, which are preferably stream-lined in cross-section and relatively thin peripherally so as to provide substantially free and unobstructed flow of motive fluid from the exhaust end of the turbine. Webs 102 are connected at their inner ends by a ring 104, which in turn supports the rear shaft bearing 106.

The combustion chamber 38 is located in the annular space 108 between the turbine casing 88 and the outer shell section 96, and the walls of the combustion chamber as spaced from the walls defining the space in which the chamber is located. Chamber 38 is preferably annular and in the form illustrated has a plurality of air inlet openings 110 at the rear end of the chamber. In front of each of the openings 110 there is advantageously located a cone 112, in the center of which is located a fuel nozzle 114, through which suitable fuel is supplied through the fuel pipe 116. Regulation of the amount of fuel supplied may be effected in any well known manner, and in apparatus of the character illustrated it is preferable to admit sufficient fuel to heat the air supplied to the combustion chamber to a temperature of 800° C. absolute or higher. An annular admission chamber 118 provides for full admission of motive fluid to the turbine and is connected to the combustion chamber by means of a number of spaced connections, one of which appears at 120 in Fig. 2, which connections pass through suitable openings in the conical casing part 86. Air, discharged from the compressor A at 122 to the space 108, flows, through the space between the outer shell and the combustion chamber and between the combustion chamber and the turbine casing in the direction indicated by the arrows in the figure, and some of the air also flows as indicated between the radially inner wall of the admission chamber 118 and the bearing 82 and packings adjacent this bearing to the inlet of the blade system of the turbine. The air flowing past the combustion chamber to the air inlets 110 and to the inlet of the turbine blade system protects the adjacent parts from heat radiated from the combustion chamber, and is also preheated before entering the combustion chamber.

The outer shell 40 is continued rearwardly of the end plate 98 by a generally conical part 124. A part 126 extends rearwardly from the inner circumferenece of the plate 98, and is connected to the part 124 at 128. A conical part 130 extends rearwardly from the ring 104 of the turbine and terminates in a bluntly pointed end at 132. From the drawings it will be evident that the part 124 serves to provide a stream-lined contour for the outer casing at the rear part of the unit, and that parts 126 and 130 provide an annular path of flow 134 through the exhaust end of the turbine, which merges into a circular path of flow 136, the latter extending to the outlet 52 through which the gases are discharged to atmosphere. The portions of the path of flow for motive fluid provided at 134 and 136 are of decreasing cross-sectional area from the outlet of the turbine to the atmospheric outlet 52 and the motive fluid which, as previously noted, is exhausted from the turbine at an intermediate pressure and with considerable residual energy, is accelerated during the course of its flow through this portion of the path of diminishing cross-sectional area. The residual pressure is thus converted into energy of velocity, and the gases are discharged to atmosphere at very high velocity to produce the desired reactive or rocket effect.

Turning now to Fig. 4, a power unit is illustrated in which the rocket propulsion effect of the exhaust gases from the turbine is combined with the propelling effect of a propeller driven by the turbine. In this arrangement the compressor A is of the same general character as that previously described, the forward end sections 72' being somewhat different in form and providing an air inlet 32' of generally annular form opening forwardly adjacent to the periphery of the compressor. At the forward end of shaft 30 there is mounted a propeller 140 of the usual air screw form. The arrangement of the combustion chamber 38 and the turbine B is generally the same as that previously described. In the present arrangement, however, more mechanical power is required for a unit of given size than in the arrangement shown in Fig. 2, since such power is required both for the compressor A and for operation of the propeller 140. Consequently, the blade system of the turbine is designed to convert a larger proportion of the available heat energy of the motive fluid into mechanical energy, and to this end the motive fluid is expanded to a lower pressure and larger volume than in the arrangement shown in Fig. 2. Consequently the path of flow for motive fluid through the turbine increases in cross-sectional area from the inlet to the outlet end of the turbine in a more pronounced manner than in the arrangement shown in Fig. 2. As in the arrangement shown in Fig. 2, the outlet 46 of the turbine is connected with the atmosphere outlet 52 by means of a passage comprising an annular portion 134 and a final circulation portion 136, this portion of the path of flow being of diminishing cross-sectional area in the direction of fluid flow to increase the velocity of the motive fluid as exhausted from the turbine, so as to utilize to the fullest extent for rocket propulsion the residual energy of the gases leaving the turbine.

Turning now to Figs. 6 and 7, a power unit is illustrated in which a double rotation radial flow turbine is utilized in a unit adapted to effect propulsion solely by rocket effect. In this embodiment two oppositely rotating shafts 142 and 144 carry respectively the turbine rotors 146 and 148, which in turn carry the blades indicated generally at 150 providing a radial flow blade system. Blades 150 are preferably of the reaction type and full admission of motive fluid is effected to the inlet end of the blade system in the direction indicated by the arrows in the figure through admission pipes 152, pipes 154 and annular admission chambers 156. Shafts 142 and 144 carry respectively the rotors of a low pressure compressor section indicated generally at 158 and a high pressure compressor section indicated generally at 160. The compressor section 158 is arranged forwardly of the turbine and has a central annular air inlet opening 32 provided between the conical shield 76 over the forward end of shaft 142 and the annular casing part 74 at the forward end of the compressor casing. Air discharged from the outlet 162 of the low pressure compressor section passes rearwardly through the space 164 past the turbine casing 166 to the inlet of the high pressure compressor section 160 and the finally compressed air is discharged from this section through the annular outlet 168. Exhaust conduits 170 extend radially through the space 164 and the outlet ends of these conduits are curved to provide rearwardly facing outlet openings 172 through which exhaust cases are discharged to atmosphere. As is more clearly shown in Fig. 7, the outlet openings 172 are arcuate in form and extend only a part of the way around the periphery of the unit at the place of discharge. Since the motive fluid is exhausted from the radial flow blade system around the entire periphery of the system it will be evident that the cross-sectional area of the atmospheric discharge openings 172 is less than the discharge area at the outlet of the blade system. From this it follows that the portion of the path of flow for motive fluid provided by outlet conduits 170 represents a portion of diminishing cross-sectional area in the direction of flow of the motive fluid. In this portion of the path of flow the velocity of the gases is increased so as to utilize the residual pressure energy of the fluid leaving the turbine to produce the desired rocket propulsion effect resulting from discharge of the gases at high velocity. Preferably the part 74 is extended rearwardly at 74' to provide suitable stream-lined flow of air past the projecting outward ends of the exhaust conduits 170. Rearwardly of the high pressure compressor section 160 the casing of the unit is extended by a conically tapering outer shell 174. Within and spaced from this outer shell and axially behind the compressor section 160 is the combustion chamber 38', which is of generally conical form and which is provided with an inlet 110' for air. Located in this inlet is the cone 112' through which fuel is discharged from nozzle 114'. A transverse plate 176 serves to carry the nozzle 114' and acts as an end-wall for the annular space 108' through which compressed air flows in the direction indicated by the arrows from the outlet of the compressor to the combustion chamber inlet. At its forward end the combustion chamber 38' is provided with outlet openings 178 communicating with the conduits 152 for conducting motive fluid to the turbine. While in the embodiment illustrated in Figs. 6 and 7 all of the energy of the motive fluid over and above that required to operate the compressor is utilized to effect propulsion by rocket effect, it will be evident that this type of apparatus, employing a radial flow turbine, may be utilized for propulsion partly by rocket effect and partly by the driving effect of a propeller. In other words, this embodiment may be modified to provide drive partly by a propeller in much the same way that the arrangement shown in Fig. 2 may be modified to provide partial propeller drive as shown in Fig. 4.

In connection with the different kinds of drive which have been described, it is to be noted that the combined drive, that is, drive partly due to rocket effect and partly due to propeller action, is to be preferred in the case of aircraft designed for use at relatively low speeds. The pure rocket drive is particularly well adapted for use with aircraft designed to fly at very high speeds. By way of example, computations show that an aircraft propelled by a combined drive with a power plant delivering 1100 horsepower can be driven a distance of 1000 kilometers at an altitude of 10,000 meters and at a speed of 520 kilometers per hour, and with a fuel consumption of about 900 kilograms. In order to drive the same craft the same distance with the same amount of power by pure rocket effect an additional 700 kilograms of fuel will be required. In spite of this increase in fuel consumption, a pure rocket drive is preferable for very high speeds since a simpler and cheaper power plant is possible with the pure rocket drive, and at very high speeds it is moreover extremely difficult to construct a propeller drive having satisfactory efficiency. To increase the thermal efficiency of the power plant a regenerator may be employed, as disclosed in the copending application Serial No. 711,088 filed by me, in which the air from the compressor is preheated before entering the combustion chamber by exhaust gas flowing from the turbine outlet to the atmospheric outlet of the unit. A regenerator of this character reduces the effective heat drop of the motive fluid available for producing rocket driving effect, but this loss is more than compensated for by the increase in thermal efficiency of the plant due to the recovery of heat from the exhaust gases to the air supplied to the combustion chamber.

From the foregoing description it will be evident that the invention may be embodied in many different specific forms and arrangements of apparatus, and that certain features of the invention may be employed to the exclusion of others. Accordingly, it is to be understood that the invention includes all forms of apparatus that may fall within the scope of the appended claims when they are construed as broadly as is consistent with the state of the prior art.

What I claim is:

1. In an aircraft having a power plant for rocket propulsion of the craft comprising a double rotation radial flow turbine having oppositely rotating shafts, compressors having rotors mounted on said shafts, and a combustion chamber for converting the air compressed by said compressors into heated motive fluid for said turbine, casing structure providing an elongated casing enclosing said turbine and said compressors and having a rearwardly extending portion enclosing said combustion chamber, radially extending conduits for conducting exhaust gases from said turbine to the exterior of said casing structure, said conduits having rearwardly directed atmospheric openings and being of diminishing cross-sectional area from the outlet of the turbine to said atmospheric openings and said casing structure having an opening at its forward end providing for free and unobstructed flow of air to the inlet of one of said compressors.

2. In an aircraft having a power plant for rocket propulsion of the craft including an axial flow gas turbine providing a path of flow in the form of an annulus of increasing cross-sectional area from the inlet to the outlet of the turbine, means providing a rearwardly directed atmospheric outlet for gases exhausted from said turbine and providing a path of flow from the outlet of the turbine to said atmospheric outlet, the portion of the last mentioned path of flow adjacent to the outlet of the turbine being of annular cross section and forming a continuation of the annular gas space of the turbine and said last mentioned path of flow being of decreasing cross-sectional area in the direction of flow of the gases therethrough.

3. In an aircraft having a power plant for rocket propulsion of the craft comprising an axial flow gas turbine providing an annular path of flow of increasing cross-sectional area for the expansion of motive fluid from the inlet to the outlet of the turbine, annular conduit means for conducting the gases exhausted from the outlet of said turbine without material change in direction and a rearwardly directed atmospheric outlet at the discharge end of said conduit means, the cross-sectional area of said atmospheric outlet being less than the cross-sectional area of the outlet of the turbine and said conduit means providing a path of decreasing cross-sectional area in the direction of the flow of gases therethrough.

ALF LYSHOLM.